US010029532B2

(12) United States Patent
Wollner et al.

(10) Patent No.: US 10,029,532 B2
(45) Date of Patent: Jul. 24, 2018

(54) STRUT BEARING WITH A TWO-COMPONENT CAP

(71) Applicant: Schaeffler Technologies AG & Co. KG, Herzogenaurach (DE)

(72) Inventors: Andreas Wollner, Nuremberg (DE); Rainer Lutz, Markt Erlbach (DE); Ralf Stautner, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/129,561

(22) PCT Filed: Mar. 2, 2015

(86) PCT No.: PCT/DE2015/200114
§ 371 (c)(1),
(2) Date: Sep. 27, 2016

(87) PCT Pub. No.: WO2015/154764
PCT Pub. Date: Oct. 15, 2015

(65) Prior Publication Data
US 2017/0136841 A1 May 18, 2017

(30) Foreign Application Priority Data
Apr. 7, 2014 (DE) .......... 10 2014 206 658

(51) Int. Cl.
*B60G 15/06* (2006.01)
*F16C 19/10* (2006.01)
(Continued)

(52) U.S. Cl.
CPC ............ *B60G 15/068* (2013.01); *F16C 19/10* (2013.01); *F16C 33/761* (2013.01);
(Continued)

(58) Field of Classification Search
CPC .......... F16C 35/02; F16C 35/06; F16C 33/74; F16C 33/78; F16C 2326/05; F16C 19/10;
(Continued)

(56) References Cited

U.S. PATENT DOCUMENTS 4,948,272 A * 8/1990 Stowe .................. B60G 15/068
384/607
5,439,298 A * 8/1995 Zernickel ............. B60G 15/068
384/499
(Continued)

FOREIGN PATENT DOCUMENTS

CN 102806815 A 12/2012
DE 10042677 A1 3/2002
(Continued)

OTHER PUBLICATIONS

Machine Translation of DE 102006057559 dated Jun. 2008.*

*Primary Examiner* — Alan B Waits
(74) *Attorney, Agent, or Firm* — Volpe and Koenig, P.C.

(57) ABSTRACT

The invention relates to strut bearing with a cap and a guide ring which is mounted in a rotatable manner about a rotational axis (D) relative to the cap. An axial bearing is arranged between the cap and the guide ring, and the cap includes a soft component and a hard component. Furthermore, the soft component has at least two circumferential sealing lips which rest against the guide ring in a sliding manner in order to seal the axial bearing. According to the invention, the soft component is formed on a hard component end face oriented towards the guide ring, and a hard component end face oriented opposite the guide ring has a profile.

9 Claims, 2 Drawing Sheets

(51) Int. Cl.
*F16C 33/76* (2006.01)
*F16C 33/78* (2006.01)

(52) U.S. Cl.
CPC .... *F16C 33/7886* (2013.01); *B60G 2204/128* (2013.01); *B60G 2204/418* (2013.01); *B60G 2206/81012* (2013.01); *F16C 2326/05* (2013.01)

(58) Field of Classification Search
CPC .... F16C 33/761; F16C 33/7886; F16C 27/06; F16C 27/066; B60G 15/068; B60G 2204/128; B60G 2204/418; B60G 2206/81012
See application file for complete search history.

(56) References Cited

U.S. PATENT DOCUMENTS

| | | | | |
|---|---|---|---|---|
| 6,267,512 | B1* | 7/2001 | Beghini | B60G 15/068 384/607 |
| 7,997,395 | B2* | 8/2011 | Ohkita | B60G 15/063 188/322.22 |
| 8,474,846 | B2* | 7/2013 | Dubus | B60G 15/068 188/321.11 |
| 8,740,472 | B2* | 6/2014 | Corbett | B60G 15/067 384/609 |
| 8,840,316 | B2* | 9/2014 | Montboeuf | B60G 15/068 384/607 |
| 8,851,762 | B2* | 10/2014 | Corbett | B60G 15/068 384/609 |
| 2011/0221158 | A1 | 9/2011 | Stautner et al. | |
| 2012/0213464 | A1* | 8/2012 | Stautner | B60G 15/067 384/607 |
| 2012/0321238 | A1* | 12/2012 | Corbett | B60G 15/068 384/590 |
| 2013/0313766 | A1* | 11/2013 | Bussit | B60G 15/068 267/195 |
| 2015/0030278 | A1 | 1/2015 | Stautner et al. | |

FOREIGN PATENT DOCUMENTS

| | | |
|---|---|---|
| DE | 10240690 | 3/2004 |
| DE | 102006057559 | 6/2008 |
| DE | 202012104645 | 3/2013 |
| DE | 102012202157 | 8/2013 |
| DE | 102012212522 | 1/2014 |
| FR | 2975947 | 12/2012 |

* cited by examiner

STRUT BEARING WITH A TWO-COMPONENT CAP

FIELD OF THE INVENTION

The invention relates to a strut bearing with a cap and with a guide ring that is supported so that it can rotate relative to the cap about a rotational axis, wherein an axial bearing is arranged between the cap and the guide ring, wherein the cap comprises a soft component and a hard component, and wherein the soft component further has at least two circumferential sealing lips that form a rubbing contact on the guide ring for sealing the axial bearing.

Strut bearings are part of the wheel suspension in independent wheel suspensions. The wheel suspension supports the goals of driver safety and comfort, as well as easy and precise steering of the wheels. The wheel suspension is designed to keep road noise away from the body and to be as lightweight as possible. Depending on the design, the strut bearing guides the shock absorber spring and forms a support surface for the shock absorber limit stop. The strut bearing receives the radial and axial forces transmitted via the shock absorber spring or the shock absorber and ensures that the shock absorber spring twists with little friction and without tensioning during steering and deflection movements and thus operates without a restoring torque.

Strut bearings are often part of so-called MacPherson struts. The strut consists essentially of a spring, shock absorber, and steering knuckle. The strut bearing is provided with a cap that is mounted on the chassis-side strut mount and also with a guide ring on which the shock absorber spring is supported and is guided by this guide ring. The guide ring is supported so that it can rotate relative to the cap. The bearing allows the spring to rotate relative to the body during steering movements, because the entire strut turns during steering movements.

From DE 10 2006 057 559 A1, a strut bearing is known that has a cap including a soft component and a hard component and a guide ring that can rotate relative to the cap. Between the cap and guide ring there is an axial bearing. The soft component is constructed as a sealing element that extends from an inner circumference up to an outer circumference of the cap. The soft component has two sealing lips. The sealing lips form a rubbing contact on the guide ring. Because the soft component is arranged on an end face of the hard component oriented toward the strut mount, the profile of the hard component cannot be matched to the profile of the strut mount, which would make possible an optimum contact of the strut bearing on the strut mount. Instead, the profile of the strut mount penetrates into the soft component and can even damage this component under unfavorable circumstances.

SUMMARY

Therefore, the objective of the following invention is to further develop a strut bearing in order to realize an optimum contact of the strut bearing on the strut mount and to enable a simple and economical production of the strut bearing, in particular, the cap.

According to the invention, the soft component is constructed on an end face of the hard component directed toward the guide ring and an end face of the hard component in the opposite direction has a profile. In other words, the soft component runs between the hard component and the guide ring, wherein the end face of the cap contacting the strut mount is formed only by the hard component. Therefore, an optimum contact of the strut bearing on the strut mount can be realized. Furthermore, this also allows a simple and economical production of the strut bearing, in particular, the cap. To do this, in a first production step, the hard component is produced with an injection molding method and in a subsequent second production step the soft component is produced with an injection molding method on the end face of the hard component oriented toward the guide ring. The profile of the end face in contact with the strut mount can therefore be formed with almost any shape.

Preferably, the profile of the end face of the hard component has a construction that is complementary to a profile of the strut mount contacting this component. This means that an increase in the profile on the end face of the strut mount engages in a recess in the profile on the end face of the hard component.

In addition, the profile on the end face of the hard component preferably has at least one recess for a screw element. In this way, a complex shape of the strut mount for receiving the screw elements is eliminated. Instead, the screw elements, in particular, the screw heads, are held by the at least one recess in the hard component.

According to one embodiment, a first circumferential sealing lip contacts an outer circumferential surface of the guide ring and a second circumferential sealing lip contacts an inner circumferential surface of the guide ring. Thus, the soft component surrounds the axial bearing and forms a rubbing seal contact on the guide ring by means of the two sealing lips.

Preferably, the second circumferential sealing lip has a hook-like construction and is arranged in a circumferential groove on the guide ring. Therefore, the cap can hook into the guide ring and can be axially secured by this snap-on connection.

In an especially preferred way, in addition to the first circumferential sealing lip, a third circumferential sealing lip contacts the outer circumferential surface of the guide ring. Here, the third circumferential sealing lip is used, in particular, for sealing against coarse contaminating particles from the outside, so that the sealing effect is increased overall.

The invention includes the technical teaching that the first circumferential sealing lip is connected to the second circumferential sealing lip by at least two webs. Due to the at least two webs between the first circumferential sealing lip and the second circumferential sealing lip, the soft component can be produced in one production step. Furthermore, the at least two webs offer an improved hold between the soft component and hard component.

According to a preferred embodiment, the soft component has at least two axial securing devices that completely fill up at least two recesses provided for this purpose in the hard component. In other words, the hard component has at least two recesses that are filled with the soft component during the injection molding of the soft component. The at least two recesses have a shape that is different from the flow channels, in particular, a larger diameter, in order to enable securing of the soft component in the hard component in the axial direction.

According to another preferred embodiment, the soft component is made from an elastollan material and the hard component is made from a polyamide material. The polyamide material is particularly well suited for receiving forces due to its stiffness and the elastollan material is particularly well suited for sealing due to its elasticity.

BRIEF DESCRIPTION OF THE DRAWINGS

Additional details and features of the invention result from the following description in connection with the drawings. The figures show.

DETAILED DESCRIPTION OF THE PREFERRED EMBODIMENTS

Figure 1:
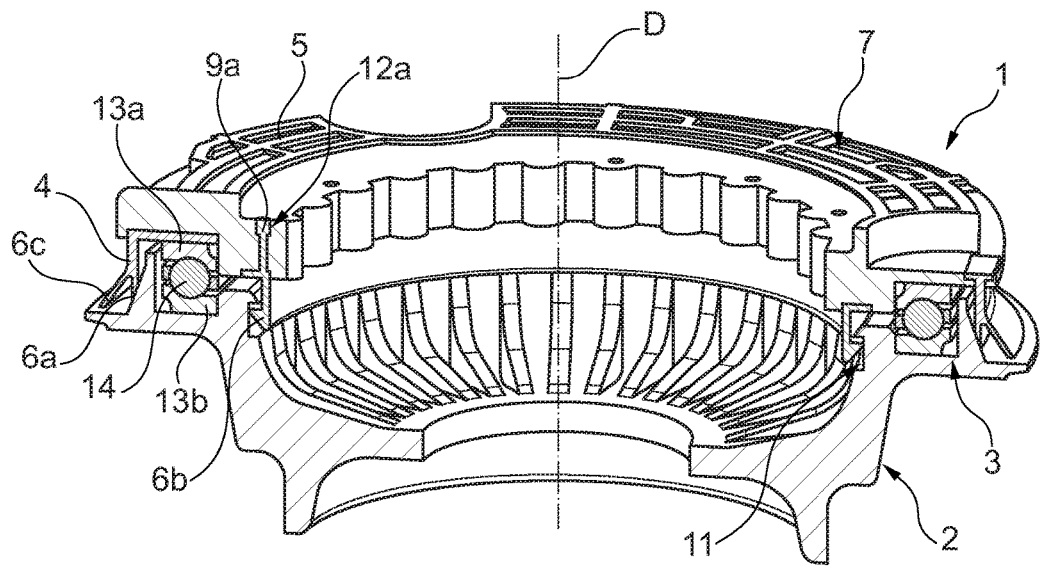
FIG. 1 a perspective section view of a strut bearing according to the invention according to a preferred embodiment, FIG. 2 a perspective section view of the strut bearing according to the invention according to FIG. 1 from a second perspective, and FIG. 3 a perspective section view of the cap according to the invention from FIGS. 1 and 2.
Figure 2:
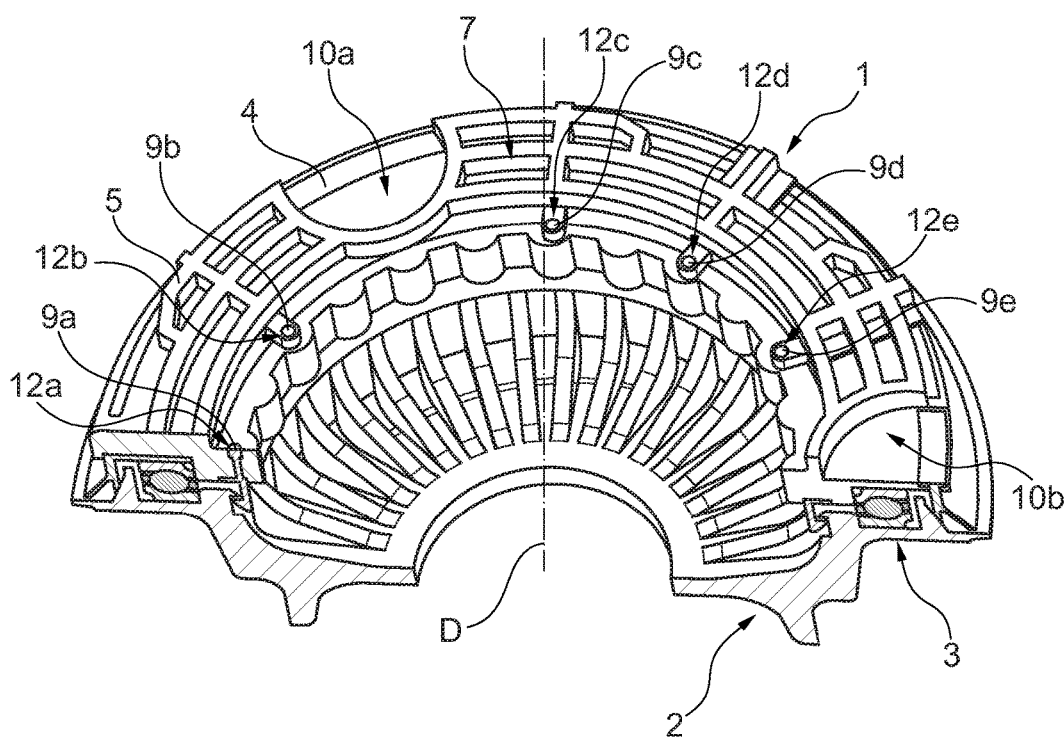

The representations according to FIGS. 1 and 2 show a strut bearing according to the invention with a cap 1 and a guide ring 2 that is produced from a glass fiber-reinforced plastic and is supported so that it can rotate relative to the cap 1 about a rotational axis D. The cap 1 is arranged on a strut mount—not shown here—in a chassis of a motor vehicle and contacts an end face on this mount. The guide ring 2 holds an axial end of a shock absorber spring that is not shown here. Spring forces of the shock absorber spring are guided via the guide ring 2 into the cap 1 and from there into the strut mount.

The guide ring 2 is supported by an axial bearing 3 on the cap 1 axially in the direction of the rotational axis D. The axial bearing 3 is used for transmitting forces acting along the rotational axis D from the guide ring 2 to the cap 1. Here, the axial bearing 3 has a plurality of rolling bodies 14 that are supported between two bearing rings 13a, 13b.

The cap 1 is constructed as a ring-shaped two-component part and comprises a soft component 4 made from an elastollan material and a hard component 5 made from a polyamide material. The cap 1 is preferably produced in a two-component injection molding method in which first the hard component 5 is injection molded and then the soft component 4 is injection molded while forming an adhesive bond connection. Here, the soft component 4 is formed on an end face of the hard component 5 oriented toward the guide ring 2.

The end face of the hard component 5 contacting the strut mount has a profile 7 that is molded by raised sections and recesses. The profile 7 of the end face of the hard component 5 has a shape that is complementary to a profile of the strut mount contacting this component. This means that the cap 1 and thus the entire strut bearing optimally contacts the strut mount and in this way the spring forces of the shock absorber spring can be optimally transmitted. The profile 7 on the end face of the hard component 5 further has two recesses 10a, 10b each for a screw element.

The soft component 4 forms the seal of the strut bearing and comprises three circumferential sealing lips 6a, 6b, 6c. A first circumferential sealing lip 6a contacts an outer circumferential surface of the guide ring 2 and a second circumferential sealing lip 6b contacts an inner circumferential surface of the guide ring 2. The second circumferential sealing lip 6b has a hook-like shape and contacts the guide ring 2 in a circumferential groove 11. Therefore, the cap 1 is connected to the guide ring 2 by a snap-on connection. The third circumferential sealing lip 6c is constructed directly next to the first circumferential sealing lip 6a and also contacts the outer circumferential surface of the guide ring 2. Furthermore, the soft component 4 has five axial securing devices 9a-9e that completely fill up the five recesses 12a-12e provided for this purpose in the hard component 5. This prevents axial loosening of the soft component 4.

Figure 3:
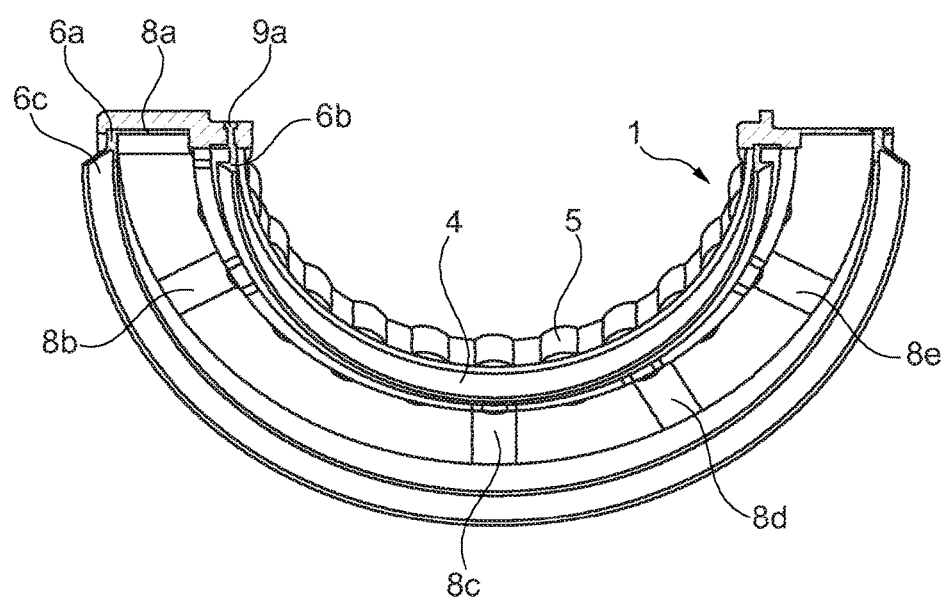

According to FIG. 3, the first and the third circumferential sealing lips 6a, 6c are connected to the second circumferential sealing lip 6b by five webs 8a-8e. Flow channels for the webs 8a-8e run on the end face of the hard component 5 oriented toward the guide ring 2, wherein the soft component 4 is constructed between the guide ring 2 and hard component 5.

LIST OF REFERENCE NUMBERS

1 Cap
2 Guide ring
3 Axial bearing
4 Soft component
5 Hard component
6a-6c Sealing lips
7 Profile
8a-8e Web
9a-9e Axial securing device
10a, 10b Recess
11 Groove
12 Recess
D Rotational axis

The invention claimed is:

1. A strut bearing comprising a cap, a guide ring supported on the cap for rotation relative to the cap about a rotational axis (D), an axial bearing arranged between the cap and the guide ring, wherein the cap comprises a soft component and a hard component, the soft component further has at least two circumferential sealing lips that form a rubbing contact on the guide ring for sealing the axial bearing, the soft component is constructed on an end face of the hard component directed towards the guide ring such that a portion of the soft component contacts the end face and is arranged axially between the hard component and a bearing ring of the axial bearing and an end face of the hard component directed in an opposite direction has a profile with raised sections and recesses.

2. The strut bearing according to claim 1, wherein the profile has at least one recess adapted to receive a screw element on the end face of the hard component.

3. The strut bearing according to claim 1, wherein a first one of the circumferential sealing lips contacts an outer circumferential surface of the guide ring and a second one of the circumferential sealing lips contacts an inner circumferential surface of the guide ring.

4. The strut bearing according to claim 3, wherein the second circumferential sealing lip has a hook-shaped construction and is arranged in a circumferential groove on the guide ring.

5. The strut bearing according to claim 3, wherein in addition to the first circumferential sealing lip, a third circumferential sealing lip contacts the outer circumferential surface of the guide ring.

6. The strut bearing according to claim 3, wherein at least the first circumferential sealing lip is connected to the second circumferential sealing lip by at least two webs.

7. The strut bearing according to claim 1, wherein the soft component has at least two axial securing devices that completely fill up at least two recesses in the hard component.

8. The strut bearing according to claim 1, wherein the soft component is made from an elastollan material and the hard component is made from a polyamide material.

9. A method for producing a strut bearing according to claim 1, wherein the hard component is produced in a first injection-molding production step and the soft component is produced in a subsequent second injection-molding production step on the end face of the hard component oriented towards the guide ring.

* * * * *